Jan. 22, 1963 G. M. DODD ETAL 3,075,153

REDUNDANT AMPLIFIER

Filed Aug. 18, 1958

INVENTORS
GLEN M. DODD
RUDOLPH A. JACOBS, JR.
BY
[signature]
ATTORNEY 3,075,153

REDUNDANT AMPLIFIER

Glen M. Dodd and Rudolph A. Jacobs, Jr., San Diego, Calif., assignors to General Dynamics Corporation, San Diego, Calif., a corporation of Delaware Filed Aug. 18, 1958, Ser. No. 755,771
11 Claims. (Cl. 330—30)

This invention relates to electronic circuits of increased reliability, and more particularly, to highly reliable electronic circuits having stage redundancy.

The problem of unreliability of electronic equipment has become increasingly severe as the complexity of such systems has increased manyfold, and as the use of such complex systems has expanded. In aircraft electronic equipment particularly, the numbers of systems employed abroad an aircraft, and their complexity has increased by a factor of several hundred percent in recent years. Further, the proper operation of many complex electronic systems employed abroad aircraft is absolutely essential to the safe flight of the aircraft. Exemplarily, failure in flight of a circuit in an automatic pilot has caused a fatal accident by causing the aircraft to pitch up so sharply that the primary structure was overstressed, and the aircraft virtually disintegrated.

It has been determined mathematically that the greatest increase of reliability of an electronic device is attained by the use of stage redundancy. Stage redundancy may be defined as providing each stage in the device with a similar stage which will perform the stage function, whereby, in the event of a failure, the stage will continue to operate. One means for providing stage redundancy in the prior art is by installing two identical stages in the device, one of which is normally in circuit. In the event of failure of the stage in circuit, a failure sensing device switches out the defective stage and substitutes the spare redundant stage. Another means known to the art for providing stage redundancy is to provide two similar stages normally operating simultaneously in parallel. Failure of one stages leaves the other stage to continue operating at a level substantially lower then the two parallel stages.

Both of the prior art methods for providing stage redundancy have inherent defects. Both require substantially double the number of components, occupy substantially double the volume, and weigh twice as much as one conventional stage. Further, the first type of redundant circuit discussed hereinabove requires failure detection and switching devices, which may themselves be unreliable, in addition to adding additional complexity, weight and bulk, and requiring additional power. In addition, the parallel channel means for providing stage redundancy heretofore known to the art has been limited to the employment of single-ended circuits. Push-pull and other balanced circuit configurations could not readily be accommodated.

In contrast with the redundant circuits of the prior art, this invention employs very few additional circuit elements, requiring little additional volume and weight. The additional elements added are compact, light, reliable, and require substantially no additional power. Both single-ended and balanced circuits may be constructed employing the present invention.

It is well known to those skilled in the art that the circuit components which are the least reliable and most likely to fail are active elements such as vacuum tubes and transistors. It is also well known that transistors are considerably less likely to fail than vacuum tubes, are much smaller and require considerably less power, resulting in widespread employment of transistors rather than vacuum tubes. Although transistors are many times more reliable than vacuum tubes, since they are the active elements in a circuit, they are more likely to fail than are such passive components as resistors and capacitors. Therefore, for utmost reliability in an electronic circuit, stage redundancy may be employed in connection with transistors.

The present invention comprises stage redundant electronic circuits which, for purposes of illustration, employ transistors. A semi-parallel configuration with feedback paths and means for automatically removing a defective transistor from the circuit is provided. In a single ended A.C. amplifier embodiment of this invention, transistors are employed in the grounded emitter configuration. Base and collector electrodes of the transistors are connected to one another while the emitter electrodes are both connected to ground through partially unbypassed resistors. The unbypassed sections of the emitter resistors furnish parallel current feedback paths, while a voltage feedback path is provided between the collectors and the base. Proper balance of the feedback paths enables removal of one of the redundant transistors from the circuit in case of failure with virtually no change in circuit characteristics. Redundant transistor circuits employing such feedback paths may be employed in either single-ended or push-pull configurations. Both single-ended and push-pull embodiments of this invention are disclosed in detail hereinbelow.

Few additional circuit components are required in addition to the redundant transistor, and only a negligible amount of additional power consumed in the losses of the additional transistor must be furnished. Thus, the tremendous additional reliability of a redundant circuit is obtained with negligible additional complexity, weight, bulk, power consumption and cost.

It is, therefore, an object of the present invention to provide a highly reliable electronic circuit employing stage redundancy.

Another object of this invention is to provide transistor circuits enabling stage redundancy.

Another object of this invention is to provide an alternating circuit transistor amplifying circuit employing stage redundancy.

Another object of this invention is to provide a stage redundant electronic circuit which may be constructed in either a single-ended or push-pull configuration.

Another object of this invention is to provide a stage redundant electronic circuit which provides high reliability and requires few additional parts and little additional power in comparison with a non-redundant circuit.

Another object of this invention is to provide a stage redundant electronic circuit which is highly reliable in operation, simple to construct, light in weight, compact, and low in price.

Other objects and features of this invention will become apparent upon perusal of the appended specification in connection with the accompanying drawings, wherein.

When applying redundancy to electronic circuitry, the components most likely to fail are provided with a redundant partner. In amplifying circuits, the active element is the one to be protected. Thus, in a transistor amplifier, redundant transistors are provided for maximum reliability of the circuit.

Figure 1:
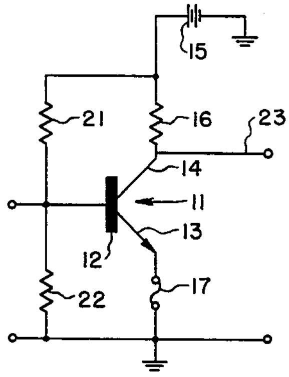
FIG. 1 illustrates the fundamental components required for a grounded emitter transistor employed in a stage redundant amplifier.

Referring now to the schematic diagram of FIG. 1, an NPN junction transistor 11, including a base electrode 12, an emitter electrode 13, and a collector electrode 14, is shown connected in the well known grounded emitter configuration. Collector electrode 14 is connected to a source of positive voltage 15, through load resistor 16. Emitter electrode 13 is connected to ground through a fuse 17. Base electrode 12 is connected to the junction between resistors 21 and 22, connected respectively to positive voltage source 15, and to ground. Resistors 21 and 22 form a biasing voltage divider to provide a positive operating potentional to base electrode 12. Thus, the base has a positive potential with respect to the emitter, and a negative potential with respect to the collector. Input signals are applied between base electrode 12 and ground and output signals are taken between output terminal 23 and ground.

A transistor may fail in several ways. As is well known to those skilled in the art, an NPN junction transistor includes a forward biased NP junction, such as that formed by emitter 13 and base 12, and a reversed biased PN junction such as the junction formed by base 12 and collector 14. A forward biased junction permits the majority carriers, which are electrons in an NPN transistor, to easily pass across the junction, thereby presenting a low impedance between the emitter and base electrodes. At a forward biased junction, a short circuit type of failure is unlikely. However, an excessive forward current through the forward biased junction will raise the temperature of the junction, destroying the semi-conducting properties of the germanium, silicon or other semi-conducting material. As a result, the forward biased junction will become an open circuit. On the other hand, since the reverse biased junction has a high impedance, an open circuit failure is unlikely. However, if too large a reverse voltage is applied, the junction will break down, permitting an avalanche breakdown current of intrinsic charge carriers to develop. The flow of avalanche current will convert the reverse biased junction into a very low impedance, approaching a short circuit.

In a stage redundant circuit, it is necessary to remove the low impedance of a defective reverse bias junction from the circuit, since, as will be apparent from FIG. 1, such a low impedance will short out the input signal. Means provided for removing the failed reverse biased junction from the circuits may simply be a fuse 17, as illustrated in FIG. 1, opened by the large avalanche current.

In addition to the forward and reverse bias junction failure discussed hereinabove, a complete junction transistor has other failure characteristics. At the base 12 to collector 14 junction, the collector 14 is reverse biased with respect to the base so that only a very small reverse current can flow between the base and collector. However, it is possible that a large reverse collector current originating at the emitter can flow through both the base and collector. Here again, a fuse placed in the emitter circuit, such as 17, will open when such a large reverse current flows, removing the emitter from the signal path. When an excessive voltage is applied to a transistor, collector to emitter "punch-through" may occur. When this happens, an effective short circuit appears between the emitter and collector, the resulting large current burning out fuse 17 in the emitter circuit.

It will be apparent, therefore, that fuse 17 in the emitter circuit of a grounded emitter transistor amplifier will effectively remove the transistor from the signal paths under such conditions of transistor failure as would place a low impedance across the signal path. Since transistor failures resulting in open circuits do not place a low impedance across the signal path, it is not necessary to provide protection therefrom.

Figure 2:
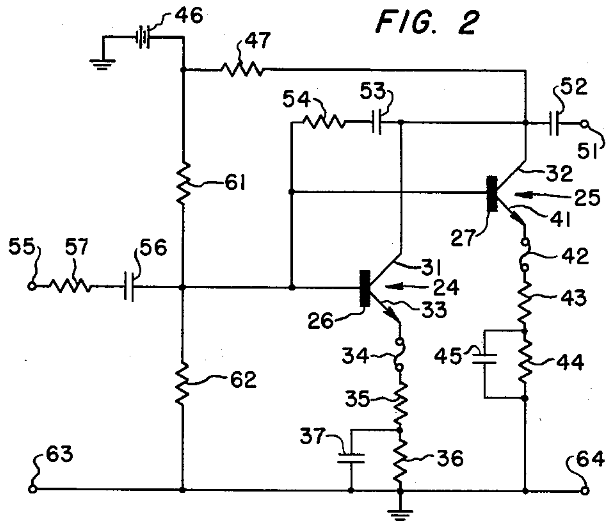
FIG. 2 illustrates a single-ended, alternating current, stage redundant amplifier embodying this invention.

Referring now to FIGURE 2, a redundant single ended A.C. amplifier stage is disclosed employing two transistors 24 and 25 in a common emitter configuration embodying this invention is illustrated. Base, or control electrodes 26 and 27 of transistors 24 and 25, respectively, are connected directly to one another, as are output, or collector electrodes 31 and 32. Emitter, or common electrode 33 of transistor 24 is connected to ground through a series circuit including fuse element 34, resistor 35, and resistor 36. As will be apparent, emitter electrode 33 is common to the circuits including both the base and collector electrodes. A bypass capacitor 37 is provided in parallel with resistor 36. In a similar manner, emitter electrode 41 of transistor 25 is connected to ground through a series circuit including fuse element 42, resistor 43 and resistor 44. Bypass capacitor 45 is provided in parallel with resistor 44. Collector electrodes 31 and 32 are connected to the positive terminal of a suitable voltage source 46 through load resistor 47, to output terminal 51 through blocking capacitor 52, and to base electrodes 26 and 27 through a voltage feedback network including capacitor 53 and resistor 54. Base electrodes 26 and 27 are connected to input terminal 55 through blocking capacitor 56 and input resistor 57. A positive bias voltage is applied to base electrodes 26 and 27 by connecting the base electrodes to the junction of a voltage divider including resistors 61 and 62. The other end of resistor 61 is connected to the positive terminal of power supply 46, while the other end of resistor 62 is connected to ground. Input terminal 63, output terminal 64, and the negative terminal of power supply 46 are also connected to ground.

Under normal conditions, the transistors in the single stage amplifier of FIGURE 2 are effectively in parallel. Identical collector voltages and base bias voltages are applied to the two transistors. The networks between the emitters and ground are identical, resulting in identical emitter voltages. Unbypassed resistors 35 and 43 provide identical emitter degenerative feedback for stabilization of transistor characteristics, and the combination of resistors 35 and 43 and bypassed resistors 36 and 43 between emitters 33 and 41 respectively, and ground, provide identical emitter bias to the parallel transistors. Input signals are applied to the base electrodes 26 and 27 in parallel, and output signals are obtained across load resistor 47 from collector electrodes 31 and 32 in parallel. The voltage feedback network including capacitor 53 and resistor 54 in series is connected between both collector electrodes 31 and 32 and both base electrodes 26 and 27. It will be apparent, therefore, that, normally, both of transistors 24 and 25 operate in the conventional manner as parallel amplifiers.

If one transistor should fail in the manner discussed hereinabove, the input impedance, gain and output impedance of the circuit illustrated in FIGURE 2 remain substantially constant. On the other hand, if the two transistors were simply connected in parallel, and one were to fail, even if removed from the circuit by a fuse in the emitter, the output voltage would increase considerably. The output voltage increase applied to the load in the simple parallel configuration is due to an increase in bias current to the base and an increase in the driving signal current as a result of the increased input impedance, and a resulting reduction in output impedance. In order to eliminate these undesirable changes in circuit characteristics upon failure of a transistor and removal thereof from the circuit by the fuse between the emitter and ground, or effective removal by an open circuit failure, two feedback circuits are provided. Assuming transistor 25 has failed, and has been effectively removed from the circuit as disclosed hereinabove, a current feedback circuit comprising unbypassed resistor 35 in the emitter circuit, and a voltage feedback circuit comprising capacitor 53 and resistor 54 serially connected between collector 31 and base 21, are provided for the remaining transistor 26. Unbypassed emitter resistor 35, functioning as a current feedback circuit, serves to substantially increase the input impedance of the amplifier as seen by the signal source. Since the signal source impedance is also high, the input signal source no longer functions as a constant current generator with respect to the amplifier input. As a result, the input signal current applied to base electrode 29 of transistor 24 remains substantially constant in contrast to the doubling of signal current without the current feedback circuit when the entire input current is transferred to base 26 of remaining transistor 24.

Since the input impedance of the complete amplifier is high due to the current feedback introduced by the unbypassed resistors in the emitter circuit, the input impedance increases as transistor 25 is removed and the input signal current applied to the base 26 of the remaining transistor 24 decreases, resulting in a drop in voltage output. However, the bias current increases as the shunt resistance of transistor 25 is removed, resulting in an increase in output voltage. In addition the output impedance increases as the shunting impedance of transistor 25 is removed, also increases the output voltage. The decrease in output voltage due to the increased input impedance caused by the current feedback circuit may thus be substantially balanced by the increase in output voltage due to the increase in bias current and output impedance. However, complete balance cannot be achieved, resulting in a reduction of output voltage upon failure of one transistor.

Means are provided, however, to more completely balance the change in circuit characteristics upon failure of one transistor. The voltage feedback circuit including resistor 54 and capacitor 53, connected between collectors 31 and 32 and bases 26 and 27 of transistors 24 and 25, respectively, serves to additionally stabilize the circuit characteristics upon failure of one transistor, such as 25. As is well known in the art, voltage feedback circuits decrease the apparent output impedance of an amplifier, tending to keep the output voltage constant. Resistor 54 and capacitor 53, forming the voltage feedback circuit, may conveniently be proportioned to provide an increase in output voltage and a decrease in output impedance to counteract the increased emitter-base impedance of transistor 25 upon failure thereof. The voltage feedback circuit also serves to additionally increase the input impedance. It will be apparent, therefore, that the input and output characteristics of the circuit of FIGURE 2 remain substantially constant upon failure, and removal from the circuit, of one of the parallel transistors. The rise in output voltage due to the increases in bias current, driving signal current, output impedance and, therefore, output voltage, are substantially over-compensated by the current feedback through the unbypassed emitter resistor, and brought into substantially complete balance by the voltage feedback network.

Figure 3:
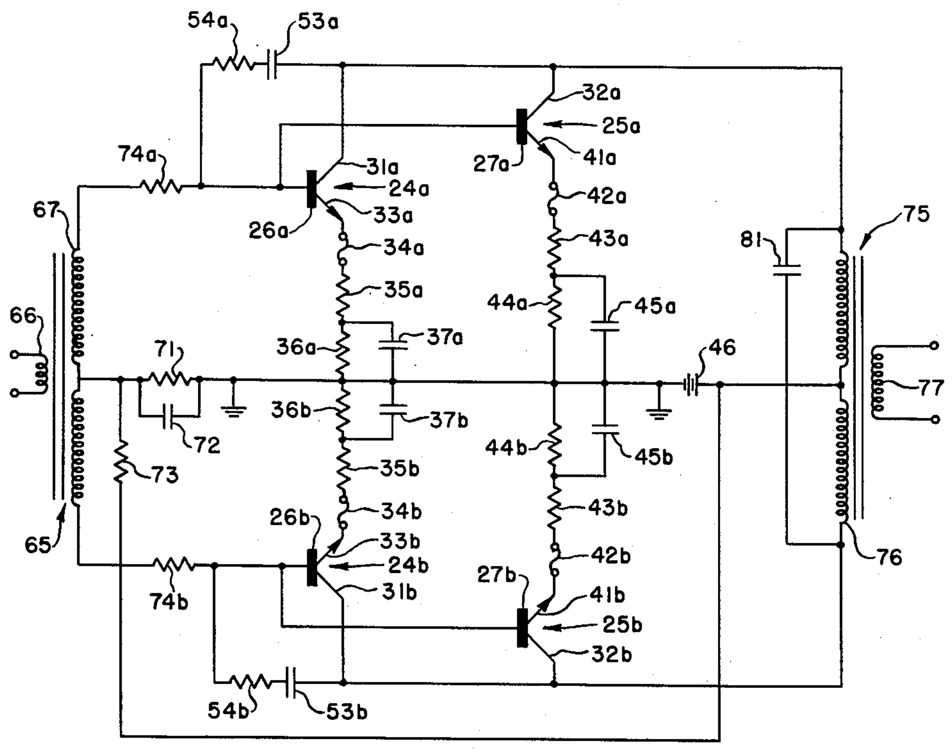
FIG. 3 illustrates a push-pull, alternating current, stage redundant amplifier embodying this invention.

Referring now to FIGURE 3, the push-pull redundant transistor amplifier illustrated therein is substantially similar to the single ended amplifier illustrated by FIGURE 2. Similar elements are indicated by similar numbers with the addition of the letter (*a*) for components in the upper half of the circuit, and the letter (*b*) for components in the lower half of the circuit illustrated in FIGURE 3.

An input transformer 65 is furnished with a primary winding 66 and a center tapped secondary winding 67. The center tap of secondary winding 67 is connected to ground through a resistor 71, connected in parallel with bypass capicitor 72, and to the positive terminal of voltage source 46 through resistor 73. One end of transformer secondary winding 67 is connected to base electrodes 26*a* and 27*a* of transistors 24*a* and 25*a* through resistor 74*a*. Similarly, base electrodes 26*b* and 27*b* of transistors 24*b* and 25*b* are connected to the other side of secondary winding 67 through resistor 74*b*. It will be apparent that resistors 71, 73, and 74*a* provide the required bias voltage to base electrodes 26*a* and 27*a* of transistors 24*a* and 25*a*, while resistors 71, 73 and resistor 74*b* provide bias voltage to base electrodes 26*b* and 27*b* of transistors 24*b* and 25*b*. Emitters 33*a* and 33*b* of transistors 24*a* and 24*b* are respectively connected to ground through fuse elements 34*a* and 34*b*, resistors 35*a* and 35*b* and resistors 36*a* and 36*b*, which are bypassed by bypass capicitors 37*a* and 37*b*. In a similar manner, emitters 41*a* and 41*b* of transistors 25*a* and 25*b* are respectively connected to ground through fuse elements 42*a* and 42*b*, resistors 43*a* and 43*b*, and resistors 44*a* and 44*b*, which are bypassed by bypass capacitors 45*a* and 45*b*. As disclosed hereinabove in connection with FIGURE 2, unbypassed emitter resistors 35*a*, 35*b*, 43*a* and 43*b* provide current feedback circuits for transistors 24*a*, 24*b*, and 25*b*, respectively.

Voltage feedback paths are provided between the collector electrodes and base electrodes of each pair of transistors. Parallel collector electrodes 31*a* and 32*a*, and parallel base electrodes 26*a* and 27*a* of transistors 24*a* and 25*a*, respectively, are interconnected by capacitor 53*a* and resistor 54*a* in serial relationship. Similarly, parallel connected base electrodes 26*b* and 27*b* are interconnected to collector electrodes 31*b* and 32*b* through the series circuit comprising capacitor 53*b* and resistor 54*b*.

Output transformer 75 comprises a center tapped primary winding 76 and secondary winding 77. The center tap of the primary winding 76 is connected to the positive terminal of voltage supply 46. One end of the primary winding 76 is connected to collector electrodes 31*a* and 32*a* of transistors 24*a* and 25*a* respectively, and the other end of primary winding 76 is connected to collector electrodes 31*b* and 32*b* of transistors 24*b* and 25*b* respectively. For fixed frequency applications, such as is connected with 400 cycle servo systems, the inductance of the primary winding 76 may be resonated by connecting a suitable capacitor in parallel therewith, forming a parallel tuned circuit tuned to the desired frequency, such as the hereinabove disclosed 400 cycles.

An input signal applied to primary winding 66 of transformer 65 is applied to the base electrodes 26*a* and 27*a* of transistors 24*a* and 25*a*, and is applied 180 degrees out of phase to base electrodes 26*b* and 27*b* of transistors 24*b* and 25*b*, by the center tapped secondary winding 67. As is well known to the art, each side of such push-pull amplifier circuits will alternately provide gain. When no input signal is applied, equal emitter currents flow on each side, flowing through each half of primary winding 76 of output transformer 75 in opposite direction toward the center tap, cancelling out saturation effects in the output transformer. The signal applied to the input transformer, at any instant, provides a voltage of one polarity to the base electrode on one side, and an equal and opposite voltage to the base electrodes on the other side. Thus, while collector current is increasing on one side, it is decreasing on the other. The collector current changes are then combined in center tapped output transformer 75.

As disclosed hereinabove, failure of one transistor, such as transistor 24*a*, will effectively remove it from the circuit. The output voltage increase due to the increase of bias current to transistor 25*a*, and the increase in output impedance, is compensated by the degenerative effect of unbypassed emitter resistor 43*a*. Further compensation is provided by the voltage feedback network including capacitor 53*a* and resistor 54*a*. Thus, the output signal remains substantially constant, and the circuit remains substantially balanced, with transistor 25*a* providing a greater portion of the output current than previously. Similarly, failure of any one of transistors 24*a*, 25*a*, 24*b* and 25*b* has substantially no effect upon the input and output characteristics of the amplifier. If one transistor on each side of the push-pull circuit fails, the two remaining transistors provide a balanced output signal with only a slight drop in output. Failure of two transistors on the same side of the push-pull circuit results in the single-ended circuit disclosed in FIGURE 2. However, even order harmonic distortion increases, generated by the transistors remaining, and by the unbalanced currents in the input and output transformers. The circuit remains useable even if three of the four transistors fail, although the gain and output voltage drop. In such an unlikely event, the output voltage drops to about 75 percent of normal in the embodiment of this invention illustrated by FIGURE 3. Thus, reliability in terms of continuous useable operation in spite of component failure is increased manyfold over devices heretofore known in the art with negligible additional complexity, bulk, weight or cost.

What we claim is:

1. A reliable amplifier circuit comprising a first amplifying device having a first control electrode, a first output electrode, and a first common electrode, a second amplifying device having a second control electrode, a second output electrode and a second common electrode, means for interconnecting said first and second control electrodes, means for interconnecting said first and second output electrodes, a first current feedback circuit connected to said first common electrode, a second current feedback circuit connected to said second common electrode, a voltage feedback circuit joining said interconnected output electrodes to said interconnected control electrodes, first current responsive circuit opening means connected to said first common electrode to effectively remove said first amplifying device from circuit upon failure thereof, second current responsive circuit opening means connected to said second common electrode to effectively remove said second amplifying device from circuit upon failure thereof, a signal input terminal connected to said interconnected control electrodes, and a signal output terminal connected to said interconnected output electrodes.

2. A reliable amplifier circuit comprising a first transistor having a first control electrode, a first output electrode and a first common electrode, a second transistor having a second control electrode, a second output electrode and a second common electrode, means for interconnecting said first and second control electrodes, means for interconnecting said first and second output electrodes, a first current feedback circuit connected to said first common electrode, a second current feedback circuit connected to said second common electrode, a voltage feedback circuit joining said interconnected output electrodes to said interconnected control electrodes, first current responsive circuit opening means connected to said first common electrode to effectively remove said first transistor from circuit upon failure thereof, second current responsive circuit opening means connected to said second common electrode to effectively remove said second transistor from circuit upon failure thereof, a signal input terminal connected to said interconnected control electrodes, and a signal output terminal connected to said interconnected output electrodes.

3. An amplifier circuit comprising a first transistor having a first base electrode, a first emitter electrode, and a first collector electrode, a second transistor having a second base electrode, a second emitter electrode and a second collector electrode, means for interconnecting said base electrodes, means for interconnecting said collector electrodes, a first current feedback circuit connected to said first emitter electrode, a second current feedback circuit connected to said second emitter electrode, a voltage feedback circuit joining said interconnected collector electrodes to said interconnected base electrodes, first current responsice circuit opening means connected to said first emitter electrode to effectively remove said first transistor from circuit upon failure thereof, second current responsive circuit opening means connected to said second emitter electrode to effectively remove said second transistor from circuit upon failure thereof, a signal input terminal connected to said interconnected base electrodes and a signal output terminal connected to said interconnected collector electrodes.

4. An amplifier circuit comprising a first transistor having a first base electrode, a first emitter electrode, and a first collector electrode, a second transistor having a second base electrode, a second emitter electrode and a second collector electrode, means for interconnecting said base electrodes, means for interconnecting said collector electrodes, a first current feedback circuit including an unbypassed resistor connected to said first emitter electrode, a second current feedback circuit including an unbypassed resistor connected to said second emitter electrode, a voltage feedback circuit joining said interconnected collector electrodes to said interconnected base electrodes, first current responsive circuit opening means connected to said first emitter electrode to effectively remove said first transistor from circuit upon failure thereof, second current responsive circuit opening means connected to said second emitter electrode to effectively remove said second transistor from circuit upon failure thereof, a signal input terminal connected to said interconnected base electrodes and a signal output terminal connected to said interconnected collector electrodes.

5. An amplifier circuit comprising a first transistor having a first base electrode, a first common emitter electrode, and a first collector electrode, a second transistor having a second base electrode, a second common emitter electrode and a second collector electrode, means for interconnecting said base electrodes, means for interconnecting said collector electrodes, a first current feedback circuit including an unbypassed resistor connected to said first emitter electrode, a second current feedback circuit including an unbypassed resistor connected to said second emitter electrode, a voltage feedback circuit joining said interconnected collector electrodes to said interconnected base electrodes, first current responsive means connected to said first emitter electrode in serial relation with said first current feedback circuit to effectively remove said first transistor from circuit upon failure thereof, second current responsive means connected to said second emitter electrode in serial relation with said second current feedback circuit to effectively remove said second transistor from circuit upon failure thereof, a signal input terminal connected to said interconnected base electrodes and a signal output terminal connected to said interconnected collector electrodes.

6. An amplifier circuit comprising a first transistor having a first base electrode, a first common emitter electrode, and a first collector electrode, a second transistor having a second base electrode, a second common emitter electrode and a second collector electrode, means for interconnecting said base electrodes, means for interconnecting said collector electrodes, a first current feedback circuit including a first unbypassed resistor connected to said first emitter electrode, a second current feedback circuit including a second unbypassed resistor connected to said second emitter electrode, a voltage feedback circuit including a resistor and capacitor connected between said interconnected collector electrodes and said interconnected base electrodes, first current responsive means connected to said first emitter electrode in series with said first unbypassed resistor to effectively remove said first transistor from circuit upon failure thereof, second current responsive means connected to said second emitter electrode in series with said second unbypassed resistor to effectively remove said second transistor from circuit upon failure thereof, a signal input terminal connected to said interconnected base electrodes and a signal output terminal connected to said interconnected collector electrodes.

7. An amplifier circuit comprising a first transistor having a first base electrode, a first common emitter electrode, and a first collector electrode, a second transistor having a second base electrode, a second common emitter electrode and a second collector electrode, means for interconnecting said base electrodes, means for interconnecting said collector electrodes, a first current feedback circuit including a first unbypassed resistor connected to said first emitter electrode, a second current feedback circuit including a second unbypassed resistor connected to said second emitter electrode, a voltage feedback circuit including a resistor and capacitor connected between said interconnected collector electrodes and said interconnected base electrodes, a first fuse element connected to said first emitter electrode in series with said first unbypassed resistor to effectively remove said first transistor from circuit upon failure thereof, a second fuse element connected to said second emitter electrode in series with said second unbypassed resistor to effectively remove said second transistor from circuit upon failure thereof, a signal input terminal connected to said interconnected base electrodes and a signal output terminal connected to said interconnected collector electrodes.

8. An amplifier circuit including a first transistor having a first base electrode, a first emitter electrode and a first collector electrode, a second transistor having a second base electrode, a second emitter electrode and a second collector electrode, a third transistor having a third base electrode, a third emitter electrode and a third collector electrode, a fourth transistor having a fourth base electrode, a fourth emitter electrode, and a fourth collector electrode, a signal source for providing a balanced, phase inverted signal, means for connecting said first and second base electrodes to one side of said signal source, means for connecting said third and fourth base electrodes to the other side of said signal source, a first current feedback circuit and first failure responsive means serially connected between said first emitter electrode and ground, a second current feedback circuit and second failure responsive means serially connected between said second emitter electrode and ground, a third current feedback circuit and third failure responsive means serially connected between said third emitter electrode and ground, a fourth current feedback circuit and fourth failure responsive means serially connected between said fourth emitter electrode and ground, each of said failure responsive means being adapted to effectively remove the transistor associated therewith from said amplifier circuit, adapted to be connected to a load, means for connecting said first and second collector electrodes to one side of said output means, means for connecting said third and fourth collector electrodes to the other side of said output means, a first voltage feedback circuit connected between said first and second collector electrodes and said first and second base electrodes, and a second voltage feedback circuit connected between said third and fourth collector electrodes and said third and fourth base electrodes.

9. An amplifier circuit including a first transistor having a first base electrode, a first emitter electrode and a first collector electrode, a second transistor having a second base electrode, a second emitter electrode and a second collector electrode, a third transistor having a third base electrode, a third emitter electrode and a third collector electrode, a fourth transistor having a fourth base electrode, a fourth emitter electrode, and a fourth collector electrode, means for providing a balanced, phase inverted signal to said amplifier circuit comprising an input transformer having a center tapped secondary winding, means for connecting said first and second base electrodes to one end of said secondary winding, means for connecting said third and fourth base electrodes to the other end of said secondary winding, a first current feedback circuit and first failure responsive means serially connected between said first emitter electrode and ground, a second current feedback circuit and second failure responsive means serially connected between said second emitter electrode and ground, a third current feedback circuit and third failure responsive means serially connected between said third emitter electrode and ground, a fourth current feedback circuit and fourth failure responsive means serially connected between said fourth emitter electrode and ground, each of said failure responsive means being adapted to effectively remove the transistor associated therewith from said amplifier circuit, balanced output means comprising a transformer having a center tapped primary winding and a secondary winding adapted to be connected to a load, means for connecting said first and second collector electrodes to one end of said primary winding, means for connecting said third and fourth collector electrodes to the other end of said primary winding, a first voltage feedback circuit connected between said first and second collector electrodes and said first and second base electrodes, and a second voltage feedback circuit connected between said third and fourth collector electrodes and said third and fourth base electrodes.

10. An amplifier circuit including a first transistor having a first base electrode, a first emitter electrode and a first collector electrode, a second transistor having a second base electrode, a second emitter electrode and a second collector electrode, a third transistor having a third base electrode, a third emitter electrode and a third collector electrode, a fourth transistor having a fourth base electrode, a fourth emitter electrode, and a fourth collector electrode, means for providing a balanced, phase inverted signal to said amplifier circuit comprising an input transformer having a center tapped secondary winding, means for connecting said first and second base electrodes to one end of said secondary winding, means for connecting said third and fourth base electrodes to the other end of said secondary winding, means connecting the center tap of said secondary winding to ground, a first current feedback circuit and first failure responsive means serially connected between said first emitter electrode and ground, a second current feedback circuit and second failure responsive means serially connected between said second emitter electrode and ground, a third current feedback circuit and third failure responsive means serially connected between said third emitter electrode and ground, a fourth current feedback circuit and fourth failure responsive means serially connected between said fourth emitter electrode and ground, each of said failure responsive means comprising a fuse adapted to open in response to excessive emitter current and thereby effectively remove the transistor associated therewith from said amplifier circuit, balanced output means comprising a transformer having a center tapped primary winding and a secondary winding adapted to be connected to a load, means for connecting said first and second collector electrodes to one end of said primary winding, means for connecting said third and fourth collector electrodes to the other end of said primary winding, a first voltage feedback circuit connected between said first and second collector electrodes and said first and second base electrodes, and a second voltage feedback circuit connected between said third and fourth collector electrodes and said third and fourth base electrodes.

11. An amplifier circuit including a first transistor having a first base electrode, a first emitter electrode and a first collector electrode, a second transistor having a second base electrode, a second emitter electrode and a second collector electrode, a third transistor having a third base electrode, a third emitter electrode and a third collector electrode, a fourth transistor having a fourth base electrode, a fourth emitter electrode, and a fourth collector electrode, means for providing a balanced, phase inverted signal to said amplifier circuit comprising an input transformer having a center tapped secondary winding, means for connecting said first and second base electrodes to one end of said secondary winding, means for connecting said third and fourth base electrodes to the other end of said secondary winding, means connecting the center tap of said secondary winding to ground, a first current feedback circuit and first failure responsive means serially connected between said first emitter electrode and ground, a second current feedback circuit and second failure responsive means serially connected between said second emitter electrode and ground, a third current feedback circuit and third failure responsive means serially connected between said third emitter electrode and ground, a fourth current feedback circuit and fourth failure responsive means serially connected between said fourth emitter electrode and ground, each of said current feedback circuits comprising an unbypassed resistor, each of said failure responsive means comprising a fuse adapted to open in response to excessive emitter current, thereby effectively remove the transistor associated therewith from said amplifier circuit, balanced output means comprising a transformer having a center tapped primary winding and a secondary winding adapted to be connected to a load, means for connecting said first and second collector electrodes to one end of said primary winding, means for connecting said third and fourth collector electrodes to the other end of said primary winding, a first voltage feedback circuit comprising a resistor and capacitor connected in series between said first and second collector electrodes and said first and second base electrodes, and a second voltage feedback circuit comprising a resistor and capacitor connected in series between said third and fourth collector electrodes and said third and fourth electrodes.

References Cited in the file of this patent

UNITED STATES PATENTS

| | | |
|---|---|---|
| 1,798,660 | Davis | Mar. 31, 1931 |
| 1,984,058 | Curtis | Dec. 11, 1934 |
| 2,680,160 | Yaeger | June 1, 1954 |
| 2,806,964 | Spades | Sept. 17, 1957 |
| 2,846,526 | Moore | Aug. 5, 1958 |
| 2,910,689 | Grace | Oct. 27, 1959 |
| 2,928,049 | MacSorley | Mar. 8, 1960 |

FOREIGN PATENTS

| | | |
|---|---|---|
| 147,096 | Australia | June 30, 1952 |

OTHER REFERENCES

German application Serial No. 537,206, printed Jan. 26, 1956 (kl.21a² 1808).

Loomis: "Modified Childs' Amplifier-Power Supply," Radio and Television News, April 1953, pages 57–60, 102.

Langford-Smith: "Radiotron Designer's Handbook," fourth edition, 1952, pages 311–312.

Langford-Smith of record, additional pages 315 and 1395.